United States Patent [19]
Luo

[11] Patent Number: 6,151,403
[45] Date of Patent: *Nov. 21, 2000

[54] METHOD FOR AUTOMATIC DETECTION OF HUMAN EYES IN DIGITAL IMAGES

[75] Inventor: Jiebo Luo, Rochester, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/920,844

[22] Filed: Aug. 29, 1997

[51] Int. Cl.⁷ .................................................. G06K 9/00
[52] U.S. Cl. ....................... 382/117; 382/118; 382/209; 382/219; 382/274; 382/308
[58] Field of Search ....................... 382/115, 118, 382/117, 116, 308, 257, 274, 209, 219

[56] References Cited

U.S. PATENT DOCUMENTS

| | | | |
|---|---|---|---|
| 5,063,603 | 11/1991 | Burt | 382/2 |
| 5,103,484 | 4/1992 | Stafford et al. | 382/1 |
| 5,128,711 | 7/1992 | Terashita et al. | 354/410 |
| 5,164,992 | 11/1992 | Turk et al. | 382/2 |
| 5,412,738 | 5/1995 | Brunelli et al. | 382/115 |
| 5,430,809 | 7/1995 | Tomitake | 382/17 |
| 5,450,504 | 9/1995 | Calia | 382/2 |
| 5,572,596 | 11/1996 | Wildes | 382/117 |
| 5,689,575 | 11/1997 | Sako et al. | 382/118 |
| 5,719,951 | 2/1998 | Shaekleton | 382/118 |

OTHER PUBLICATIONS

Alan L. Yuille, et al., "Feature extraction from faces using deformable templates", IEEE 1989, pp. 104–108.

Alan L. Yuille "Feature extraction from faces using deformable Templates" IEEE Computer Vision & Patten recognition, pp. 104–109, 1987.

*Primary Examiner*—Matthew Bella
*Assistant Examiner*—Sheela Chawan
*Attorney, Agent, or Firm*—David M. Woods

[57] ABSTRACT

A computer program product for locating first and second objects, each having substantially the same physical characteristics, and the ratio of the distance between the first and second objects and the size of each object is substantially invariant, the computer program product comprises: a computer readable storage medium having a computer program stored thereon for performing the steps of determining potential flesh regions in an image; determining valley regions in an image; performing template matching for determining a plurality of locations that give a desirable match of the object relative to the template; and performing verification for determining the likelihood of pairs of potential eye candidates at the locations determined in the performing template matching step.

49 Claims, 12 Drawing Sheets

θ1: orientation of the first object (in this case negative)
θ2: orientation of the second object (in this case positive)
θ : orientation of the line connecting the centers of the first and second objects
d : distance between the centers of the first and second objects
s1 : size of the first object
s2 : size of the second object

*FIG. 8*

A PREFERRED SCORING FUNCTION f(x)

*FIG. 9*

FIG. 10

METHOD FOR AUTOMATIC DETECTION OF HUMAN EYES IN DIGITAL IMAGES

CROSS REFERENCE TO RELATED APPLICATIONS

The present invention is related to U.S. patent application Ser. No. 08/919,560 filed Aug. 29, 1997 entitled A COMPUTER PROGRAM PRODUCT FOR REDEYE DETECTION to Schildkraut et al, and U.S. patent application Ser. No. 08/919,561 filed Aug. 29, 1997 entitled A COMPUTER PROGRAM PRODUCT FOR LOCATING OBJECTS IN AN IMAGE to Luo et al, and assigned to the assignee of the present invention.

FIELD OF THE INVENTION

The invention relates generally to the field of digital image processing and, more particularly, to locating objects in a digital image.

BACKGROUND OF THE INVENTION

Identifying objects in an image is performed in a variety of image processing functions. For example, in correcting for red-eye in images, the human eye is located and the undesirable red portion in the eye is replaced with a more aesthetically pleasing color. In the "KODAK" digital print station, the image is displayed on a touch screen and one eye is repeatedly touched for further zooming in on the red portion of the eye upon each touch. The red portion of the eye is then identified by searching for red pixels in the area defined by the zooming process, and the identified red pixels are replaced with a predetermined color for making the image more aesthetically pleasant. The process is then repeated for the other eye.

A neural networks method of locating human eyes is disclosed in *Learning An Example Selection for Object and Pattern Recognition,* The AI-Lab, MIT by K. K. Sung, November 1995. This method discloses training the a neural net to recognize eyes with acceptable distortion from a pre-selected eye template. The operator repeatedly distorts the original eye template and all variations produced from distorting the eye are labeled as either acceptable or unacceptable. The distorted samples, i.e., the training images, and the associated labeling information are fed to the neural net. This training process is repeated until the neural net has achieved satisfactory recognition performance for the training images. The trained neural net effectively has stored possible variations of the eye. Locating an eye is done by feeding a region in the image to the neural net for determining if a desired output, i.e., a match, occurs; all matches are identified as an eye.

Although the presently known and utilized methods of identifying eyes are satisfactory, they are not without drawbacks. The touch screen method requires constant human interaction of repeatedly touching the touch screen for zooming in on the eye and, as a result, is somewhat labor intensive. Still further, the neural net method requires extensive training and is also computationally intensive in the matching process because an exhaustive search has to be performed for all the possible sizes and orientations of the eye.

Consequently, a need exists for improvements in the method of locating objects in an image so as to overcome the above-described drawbacks.

SUMMARY OF THE INVENTION

The present invention is directed to overcoming one or more of the problems set forth above. Briefly summarized, according to one aspect of the present invention, the invention is directed to a computer program product for locating first and second objects, each having substantially the same physical characteristics, and the ratio of the distance between the first and second objects and the size of each object is substantially invariant, the computer program product comprising: a computer readable storage medium having a computer program stored thereon for performing the steps of: (a) determining potential flesh regions in an image; (b) determining valley regions in an image; (c) performing template matching for determining a plurality of locations that give a desirable match of the object relative to the template; and (d) performing verification for determining the likelihood of pairs of potential eye candidates at the locations determined in step (c).

It is an object of the present invention to provide a method of finding objects in an image which overcomes the above-described drawbacks.

It is also an object of the present invention to provide a method of finding objects in an image in an automated manner.

It is a further object of the present invention to provide a method of estimating the physical size of the objects to be found.

It is still a further object of the present invention to provide a method of estimating the physical orientation of the objects to be found.

It is an advantage of the present invention to provide an efficient method of locating objects in an image.

It is a feature of the present invention to determine an estimated size of each object based on the shape and size of the region where the said objects potential reside.

It is a feature of the present invention to determine an estimated orientation of each object based on the shape and orientation of the region where the said objects potential reside.

It is a feature of the present invention to determine a pair (or a group) of objects based on the a plurality of figures of merit determined based on prior knowledge about the relationship between the first and second objects.

The above and other objects of the present invention will become more apparent when taken in conjunction with the following description and drawings wherein identical reference numerals have been used, where possible, to designate identical elements that are common to the figures.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
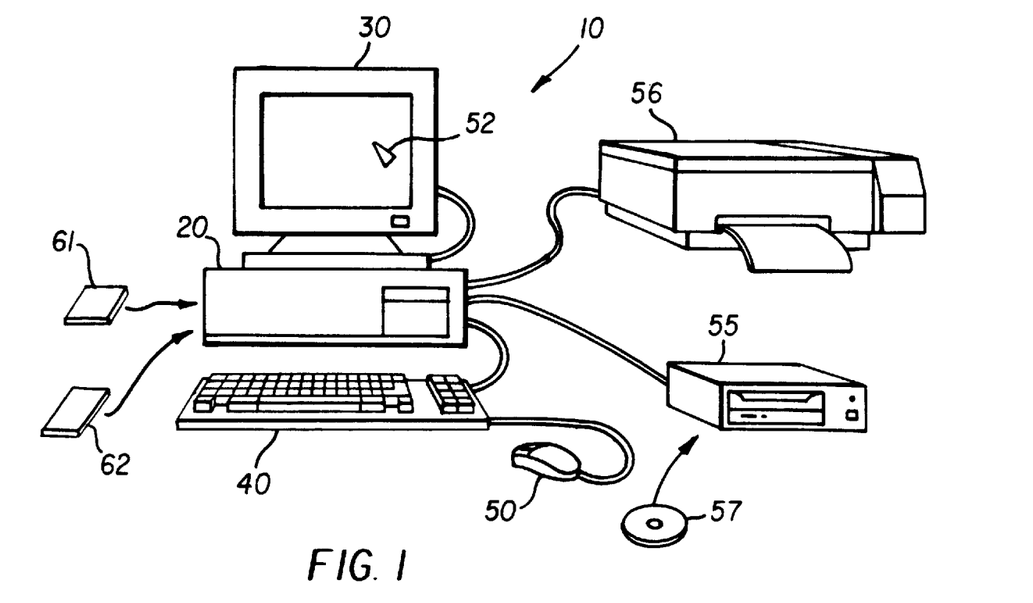
FIG. 1 is a perspective view of a computer system for implementing the present invention.

Referring to FIG. 1, there is illustrated a computer system 10 for implementing the present invention. Although the computer system 10 is shown for the purpose of illustrating a preferred embodiment, the present invention is not limited to the computer system 10 shown, but may be used on any electronic processing system. The computer system 10 includes a microprocessor based unit 20 for receiving and processing software programs and for performing other processing functions. A touch screen display 30 is electrically connected to the microprocessor based unit 20 for displaying user related information associated with the software, and for receiving user input via touching the screen. A keyboard 40 is also connected to the microprocessor based unit 20 for permitting a user to input information to the software. As an alternative to using the keyboard 40 for input, a mouse 50 may be used for moving a selector 52 on the display 30 and for selecting an item on which the selector 52 overlays, as is well known in the art.

A compact disk-read only memory (CD-ROM) 55 is connected to the microprocessor based unit 20 for receiving software programs and for providing a means of inputting the software programs and other information to the microprocessor based unit 20 via a compact disk 57, which typically includes a software program. In addition, a floppy disk 61 may also include a software program, and is inserted into the microprocessor based unit 20 for inputting the software program. Still further, the microprocessor based unit 20 may be programmed, as is well know in the art, for storing the software program internally. A printer 56 is connected to the microprocessor based unit 20 for printing a hardcopy of the output of the computer system 10.

Images may also be displayed on the display 30 via a personal computer card (PC card) 62 or, as it was formerly known, a personal computer memory card international association card (PCMCIA card) which contains digitized images electronically embodied the card 62. The PC card 62 is ultimately inserted into the microprocessor based unit 20 for permitting visual display of the image on the display 30.

Figures 2A, 2A:
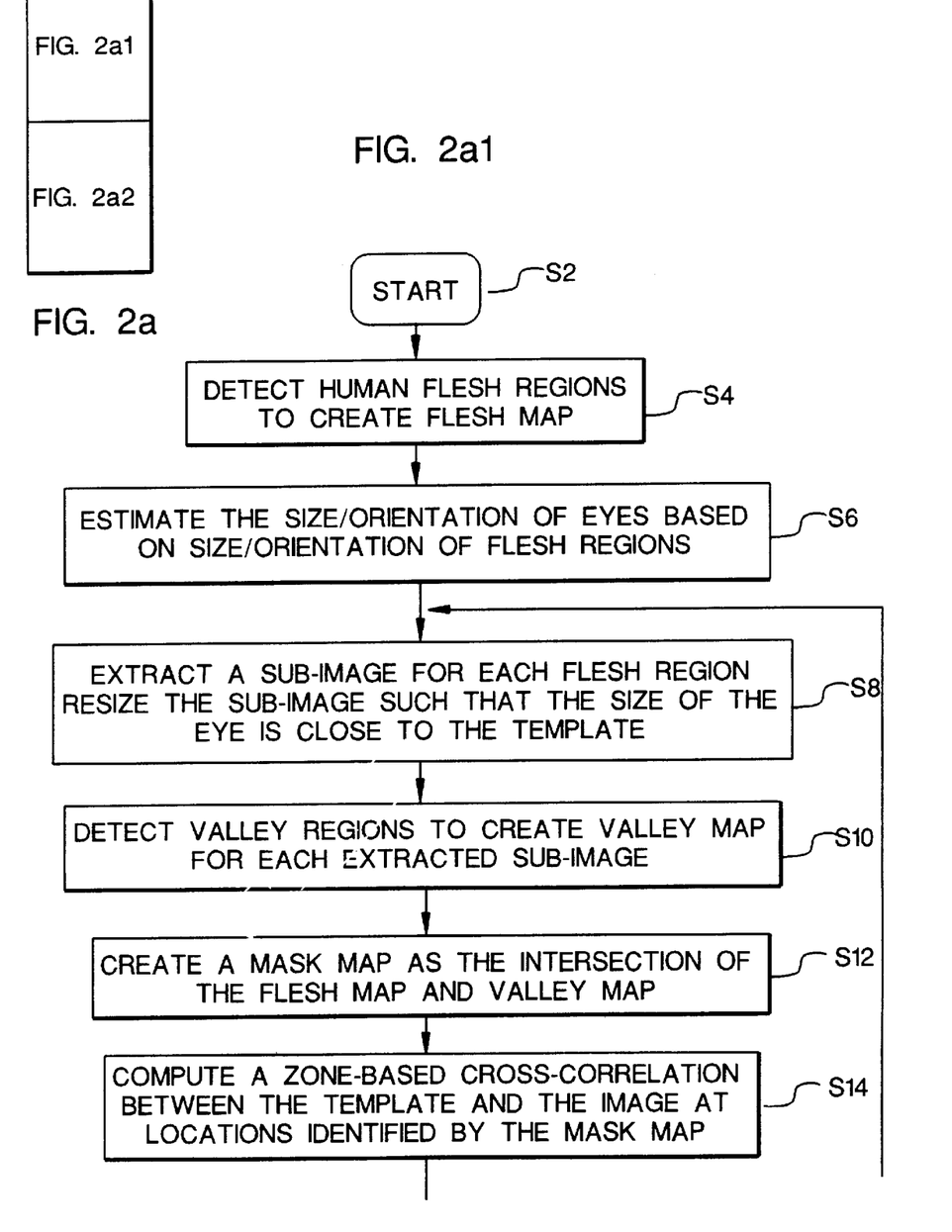
FIG. 2a is a diagram illustrating the searching procedure used by the present invention.
Figure 2A:
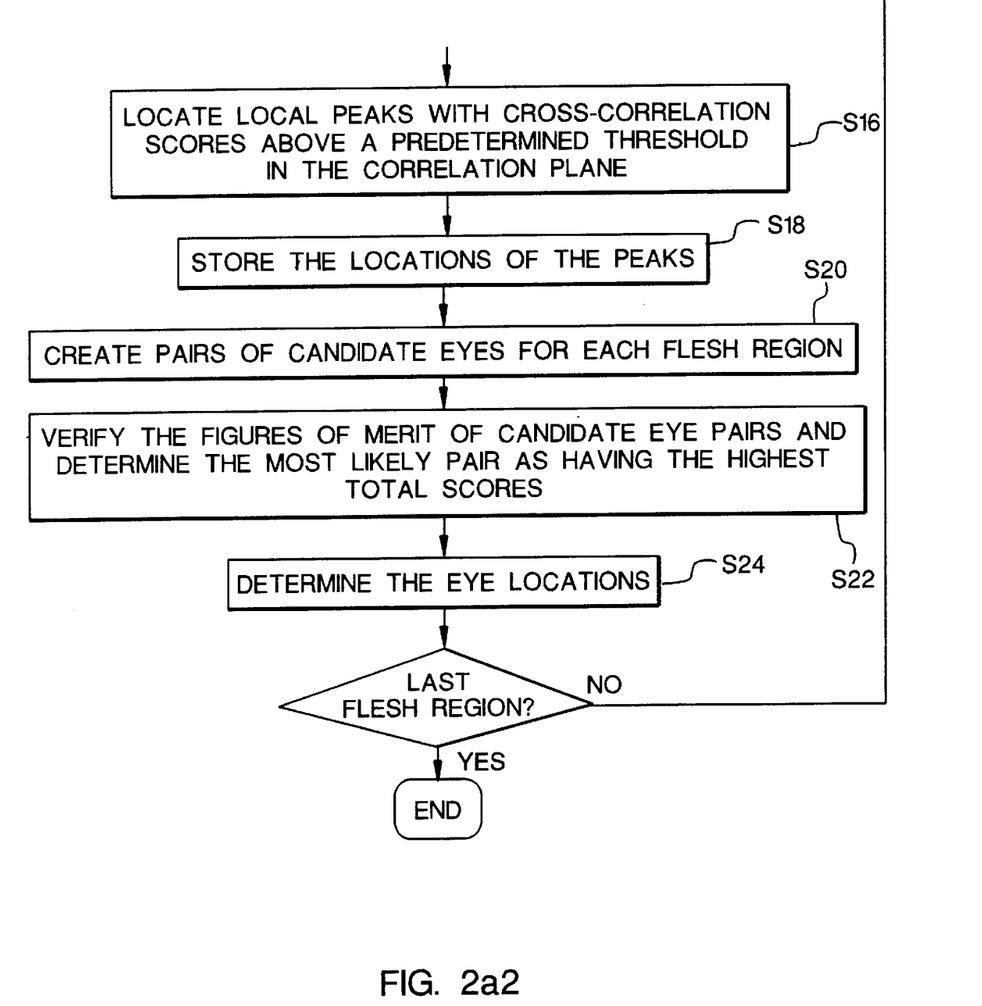
FIG. 2b is a detailed diagram illustrating the zone-based cross-correlation process.

Referring to FIG. 2a, there is illustrated a flowchart of a software program of the present invention. Before discussing the details of the flowchart, it is instructive to note that, although a portion of the program includes detecting human flesh, any animal flesh may be detected provided the program is modified, as will be apparent to those skilled in the art. The program is initiated S2 and then detection of human flesh is performed to create a flesh map S4.

Figure 3:
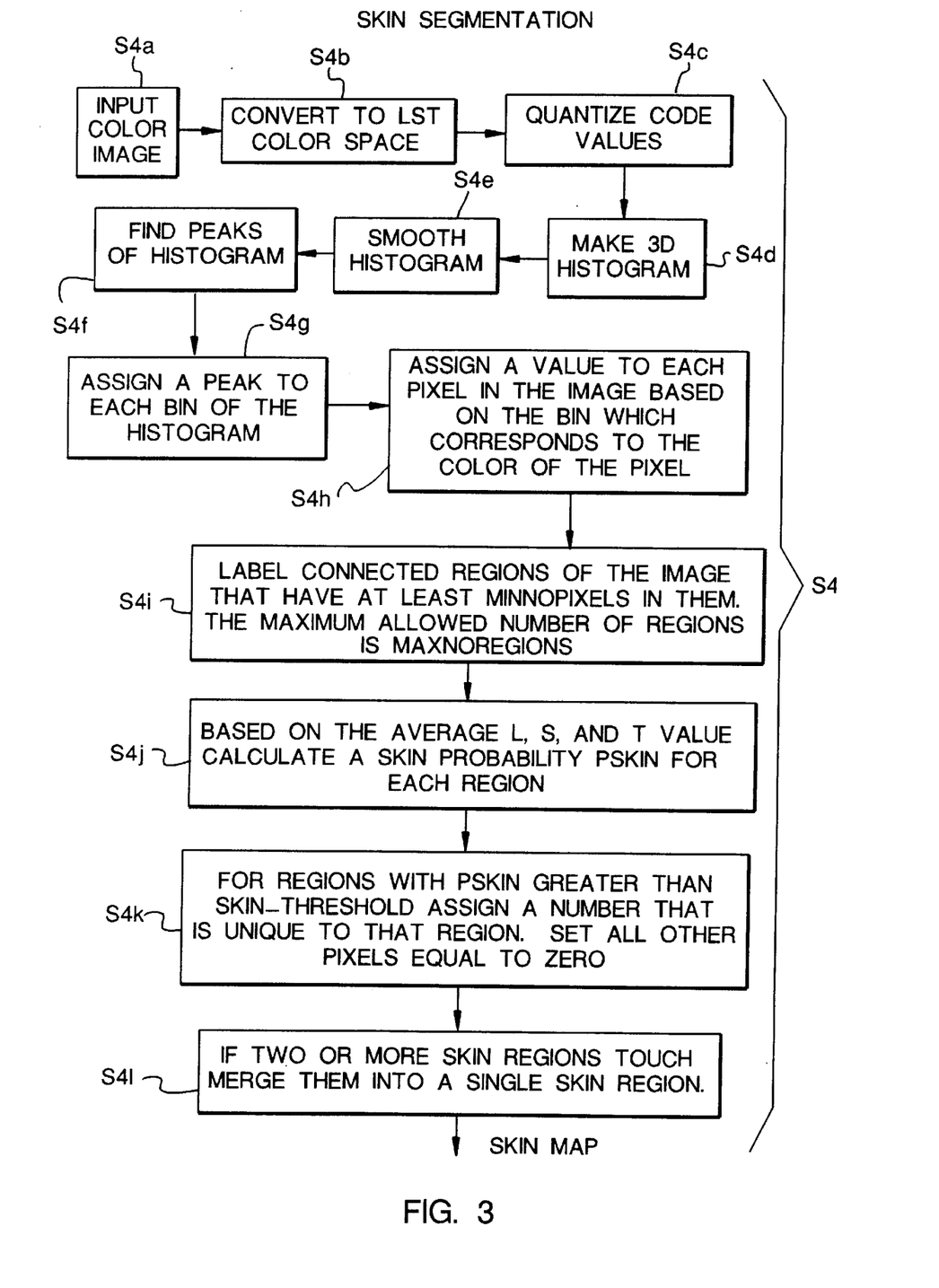
FIG. 3 is a detailed diagram illustrating the flesh detection process.

Referring to FIG. 3, there is illustrated a detailed flowchart of creating the flesh map S4. In this regard, a color image is input S4a into the microprocessor-based unit 20 by any well known means, such as the PC card 62, and is converted S4b into a color space, preferably LST color space. The image code values are then quantized S4c to reduce the total number of histogram bins. A three dimensional (3D) histogram is created S4d for the typically 3-channel color image. This 3D histogram is smoothed S4e to reduce the noise, and the peaks in the 3D histogram are then located S4f. Bin clustering is performed by assigning a peak to each bin of the histogram S4g. For each pixel in the color image, a value is assigned based on the bin that corresponds to the color of the pixel S4h. Connected regions that have at least a minimum number of pixels (MinNoPixels), preferably 50 pixels although other values may also be used, in them are labeled S4i. The maximum number of allowed number of regions is MaxNoRegions S4i, preferably 20 regions although other values may also be used. Based on the average transformed color component values of human flesh and the average color values of a given region, a flesh probability Pskin is calculated for each labeled region S4j. A unique label is assigned to a region with Pskin greater than SkinThreshold S4k, preferably 0.7 although other values may also be used. All the non-flesh pixels are set to zero. If two or more flesh regions touch, they are merged into a single flesh region S4l.

Figure 4:
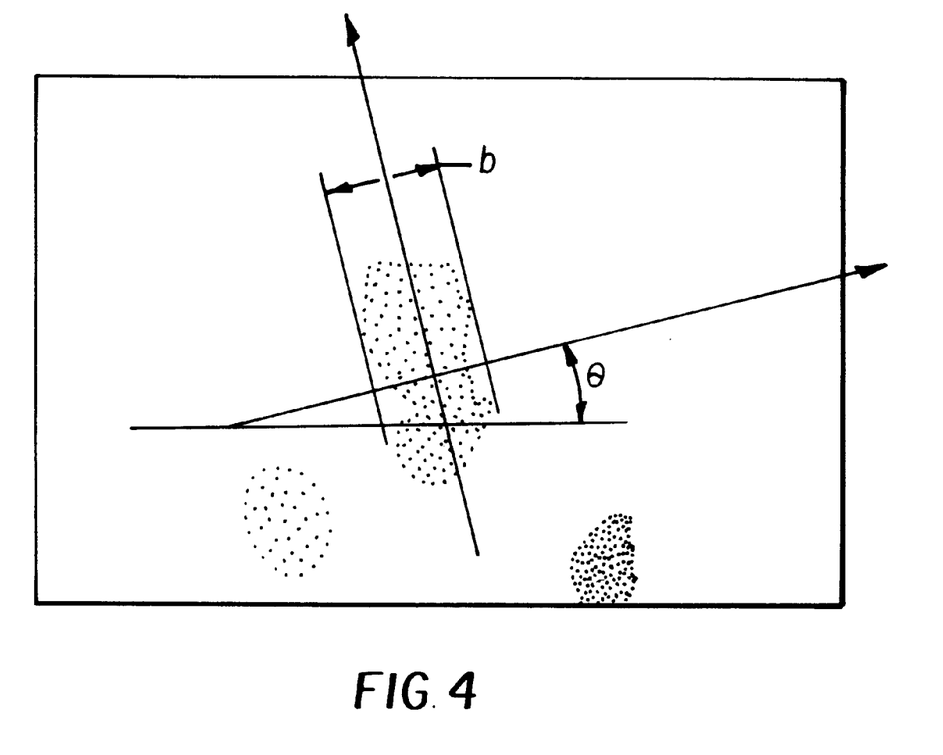
FIG. 4 is a detailed diagram illustrating the valley detection process.

Referring to FIG. 4, the program receives the flesh map data and performs a well known elliptical fitting technique for each connected flesh region. The aspect ratio and compactness of the fitted ellipse are measured to reject flesh regions of irregular shapes. The aspect ratio is the defined as the ratio of the long axis and short axis, and compactness is defined as ratio of the enclosed area by the fitted ellipse and the area of the entire flesh region. If the aspect ratio of the fitted ellipse is above three, it is rejected, or the compactness is below 0.9, it is rejected. Referring back to FIG. 2a, the program then determines a program estimated size and orientation of the eyes S6 according to the ellipse fitted to each remaining flesh region using the following equation, which is graphically illustrated in FIG. 4:

$$s=b/4$$

where b is the length of the minor axis of the fitted ellipse in pixels and s is the estimate size, or length, of the eye in pixels.

Figure 6:
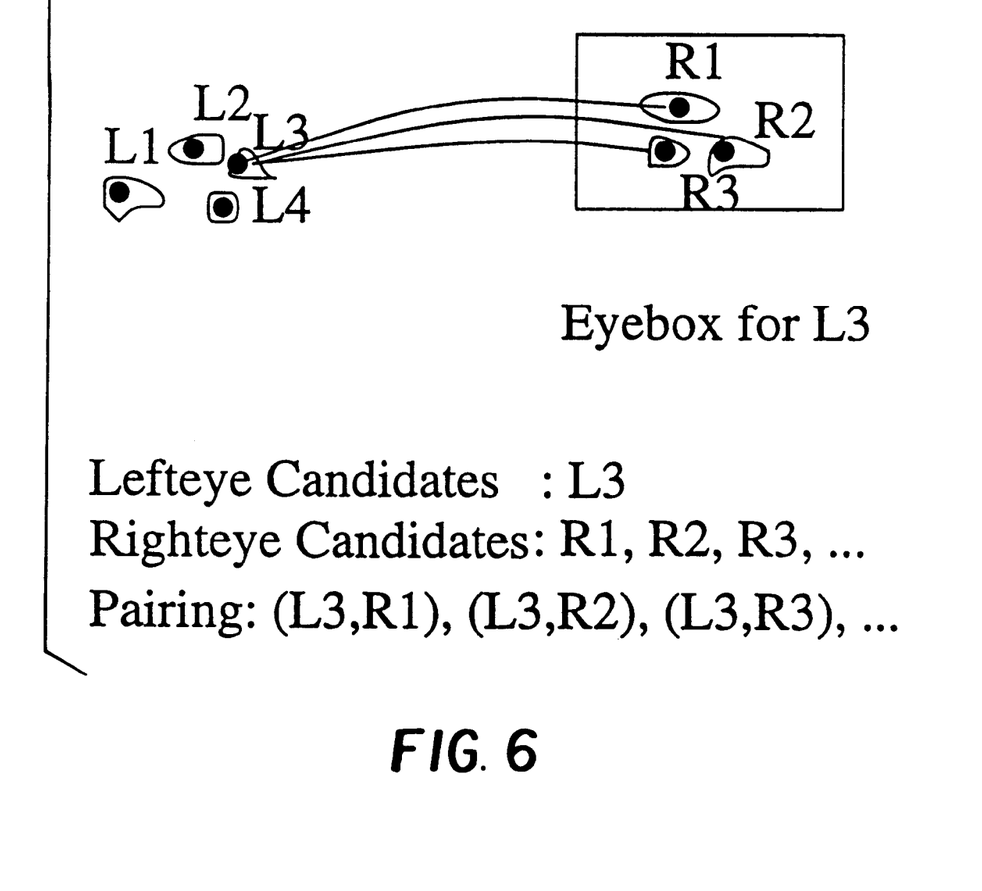
FIG. 6 is an illustration of the pairing of eye candidates.

An estimated angular orientation of the eye is also generated from the orientation of the fitted ellipse S6, as illustrated in FIG. 4. The assumption is that the two eyes are aligned and therefore the orientation of each eye is approximately the same as the orientation of the minor axis of the fitted ellipse. This angle, denoted by θ, is between the minor axis and a horizontal line. A sub-image is extracted for each flesh region S8. It is instructive to note that, from this estimated eye size, the resolution of the extracted sub-image is changed so that the eyes in the image have approximately the same size as the eye template S8. As shown in FIG. 6, a particular eye template has a resolution of 19 pixels horizontally and 13 pixels vertically. This resolution change, or resizing, enables the eyes in the images to be matched at the same resolution of a template and against the same amount of structural detail, as will be described in detail herein below. An alternative is to design a set of templates with different amounts of detail and keep the resolution of the image unchanged. Such an alternative design is readily accomplished by those skilled in the art.

Figure 5:
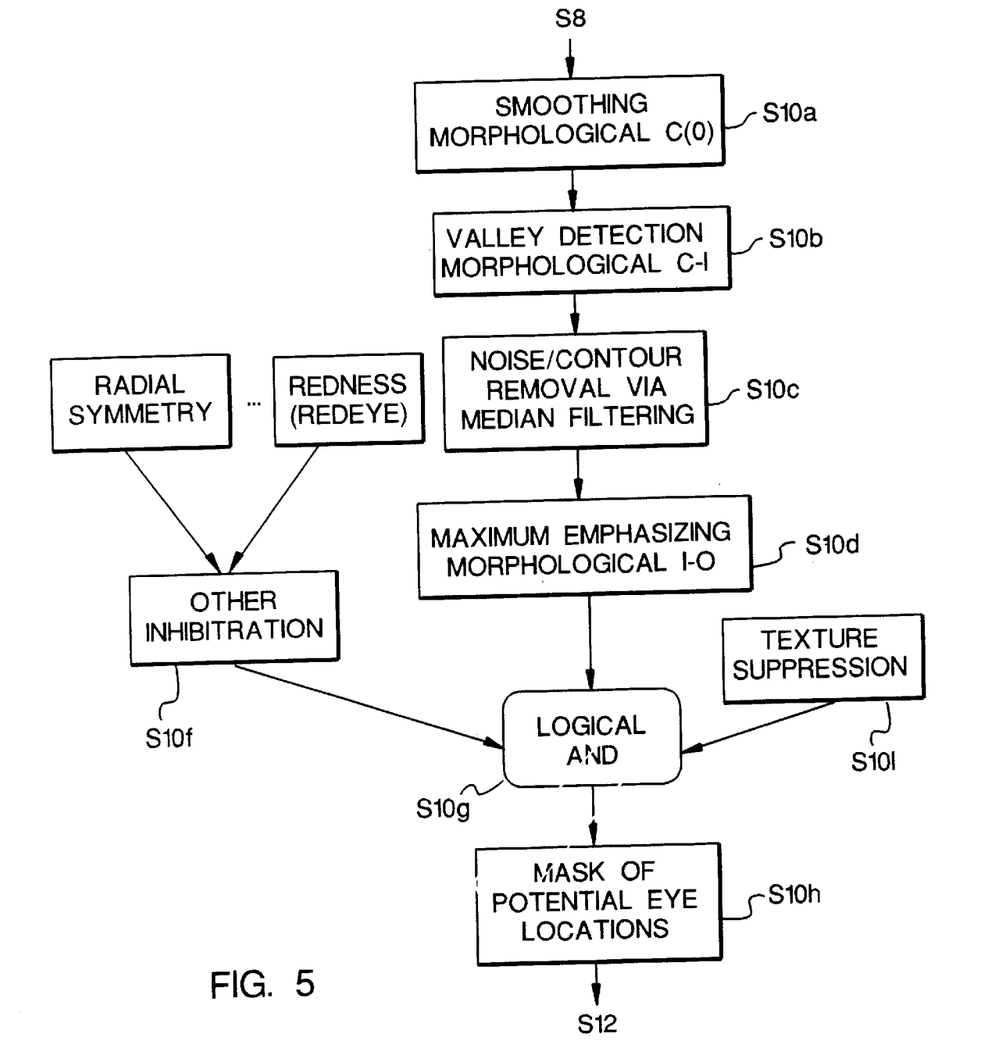
FIG. 5 is a view of the zone partition of the template by the present invention.

Referring back to FIG. 2a, valley detection is performed to create a valley map for each extracted sub-image S10. The purpose of valley detection is to remove flat flesh regions from further consideration. Referring to FIG. 5, valley detection consists of a plurality of steps. First, a smoothing operation is performed to reduce any noise and small specular highlight in the eye or eyeglasses that may be present, preferably using a morphological opening followed by a morphological closing S10a. The valley regions in the smoothed image are identified, preferably as the output of the difference between a morphologically closed image and itself S10b. The code values of this output image represent the confidence of the presence of a valley. A median filtering operation is applied to the obtained valley image to reduce noise and long thin structures in the image S10c. In general, eyes do not reside in any long thin structure in the valley image. Also, the absolute code value in the valley image does not necessarily correspond to likelihood of an eye socket. However, local maximums in the processed valley image are emphasized, preferably using the difference between the valley image and its morphologically closed version S10d. The result of S10d is combined with the result of texture suppression S10e as well as other inhibitory mechanisms S10f, e.g., "redness" of the eye in the case of red-eye detection by a logic AND operation S10g.

After S10g, pixels with code values greater than a predetermined threshold are set to one, and zero otherwise. A binary valley map is thus created S10h. A mask map for directing the subsequent searching is created as the intersection of the skin map and valley map S12.

The cross-correlation between the template and the image is computed by sequentially moving the center pixel of the template to each pixel in the searching mask map of each flesh region and performing a specific type of zone-based cross-correlation at each pixel location for determining the center pixel of the eye S14, as will be described in detail below.

Figures 2B, 2B:
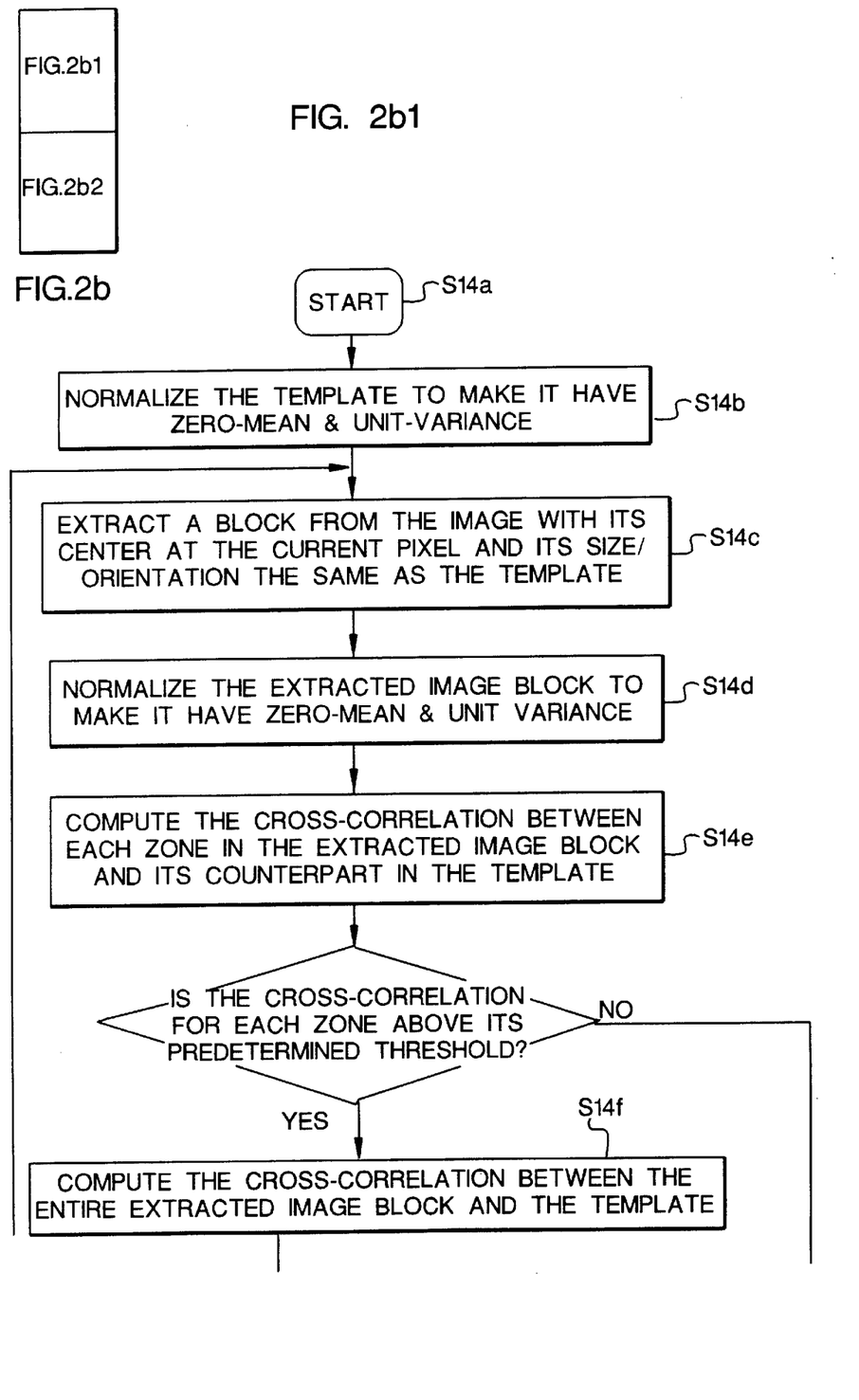
Figure 2B:
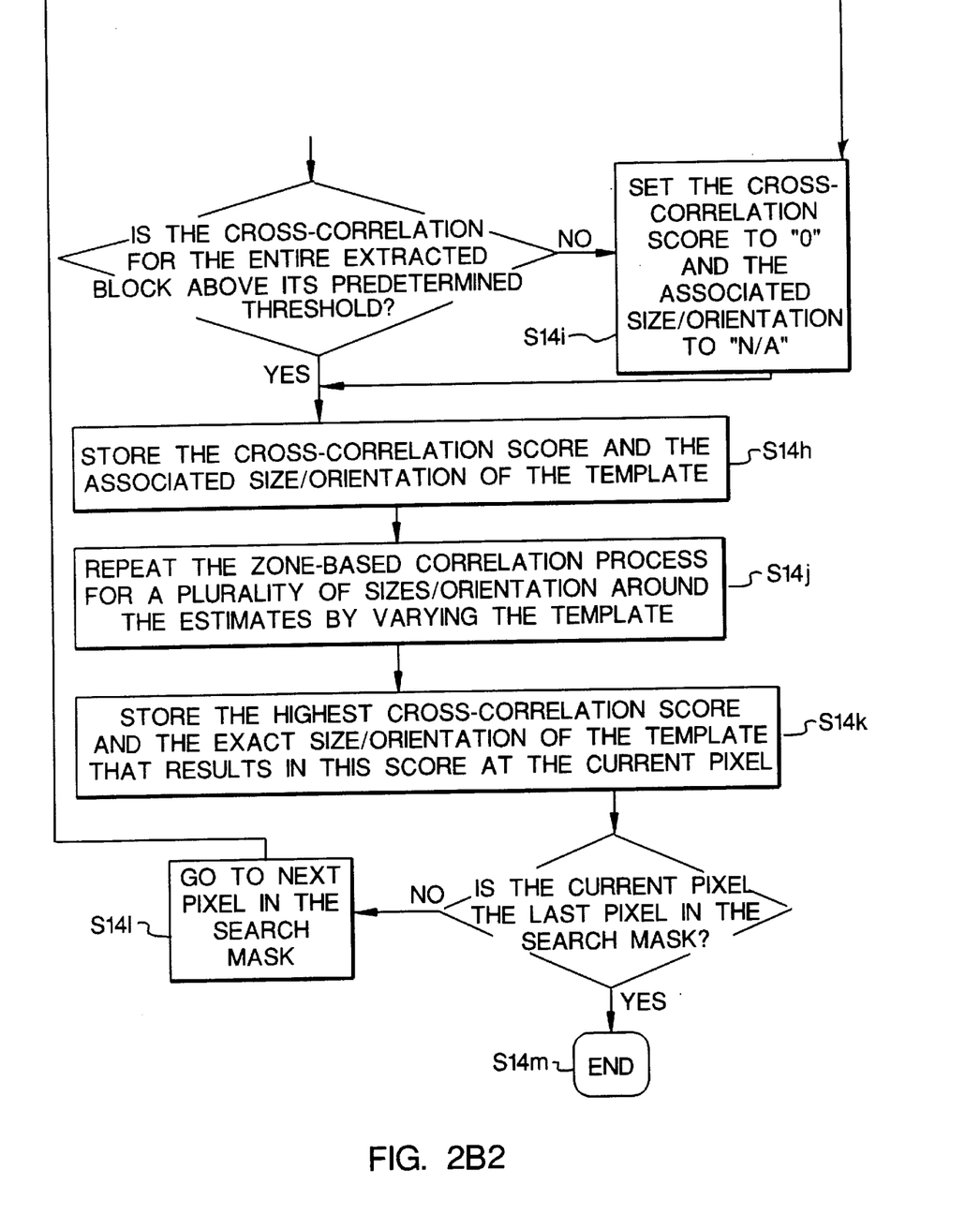

Referring briefly to FIG. 2b, a zone-based cross-correlation S14 is initialized S14a. A template is then retrieved and normalized S14b, if it is not already stored in a normalized state. Referring briefly to FIG. 6, the template is preferably generated from sampling a plurality of eyes and relating their corresponding pixel values, for example by taking the average values at each pixel location. The template is then partitioned into four sub-regions that represent the eyelid, iris, and the two corners of the eye. To normalize the template, the average pixel value for the entire template image is subtracted from each pixel value and the resulting pixel value is divided by the standard deviation of the entire template image for obtaining a normalized pixel value. The resulting template therefore has a mean value of zero and a unit variance.

More specifically, and referring back to FIG. 2b, with the center of the template at the pixel location of interest, the zone-based cross-correlation includes, first, extracting a block from the image with its center at the current pixel and its size/orientation the same as the template S14c, normalizing the extracted image block S14d, computing the cross-correlation between each sub-region of the extracted block and its counterpart in the template with the pixel of the image at the center of the sub-region S14e, hereinafter referred to as a zone-based correlation. If the cross-correlation for each sub-zone meets or exceeds a predetermined threshold, preferably 0.5, cross-correlation is performed with the entire template to the same image pixels of interest S14f, hereinafter referred to as a complete correlation. If a threshold, preferably 0.7, is again met, the program temporarily stores the correlation value and the size/orientation of the template in a buffer S14h. If the cross-correlation for one or more sub-zones fails the threshold or the cross-correlation for the entire template fails the threshold, the cross-correlation at the pixel of interest is set to "0" and the associated size/orientation are set to "N/A" S14i. The program then continues to next pixel location in the search mask map S14l for repeating the above-described partitioned and complete correlation operations, if not the last pixel with nonzero mask value in the concerned flesh region.

The above-described zone-based correlation and complete correlation is repeated by varying the template for a plurality of sizes around the estimate size (increasing and decreasing) and a plurality of orientations around the estimate orientation (clockwise and counter-clockwise rotation), in order to refine the size and orientation of the eye S14j. Such increasing and decreasing of the template size/orientation is readily accomplished by those skilled in the art. This refinement involves the same previously described steps, S14c–S14i. If one or more complete correlation scores at a pixel location of interest result in a value above the threshold, the program selects the highest correlation value in the temporary buffer and its corresponding template size/orientation used for obtaining the highest value and places them in memory S14k. It facilitates understanding to note that the above-described varying of the template size is for further refining the estimated size of the eye from Eq. 1, and the size/orientation of the best-matching template variation in turn indicate the exact size/orientation of the actual eye.

For example, the template size is increased by 10% and by 10%. If the highest correlation value is from the 19×13 resolution template, the estimated size of the eye is not adjusted. If either of the other resolutions produce the highest correlation value, the estimated size of the eye is adjusted so that it matches the template size producing the highest correlation score. Similarly, the template orientation is increased by 10 degrees and decreased by 10 degrees. If one or more complete correlation scores at the pixel location of interest result in a value above the threshold, the program selects the highest correlation value in the temporary buffer and its corresponding template orientation used for obtaining the highest value and places it in memory. If the highest correlation value is from the template at the original estimated orientation, the estimated orientation of the eye is not adjusted. If either of the other orientations produce the highest correlation value, the estimated orientation of the eye is adjusted so that it matches the template orientation producing the highest correlation value.

As stated previously, the program then continues to next pixel location identified by the search mask for repeating the above-described zone-based and complete correlation S14l after the size and orientation have been refined for the pixel of interest S14k.

The program continues on to verify the most likely candidates from the plurality of peak-correlation points in each window as the center pixel of the eye S16–S24. The peak points are located as the points having a local maximum complete correlation score S16. The locations of these peaks are stored in a buffer S18. Referring to FIG. 6, to verify, a plurality of verification steps are used. The steps involve matching known characteristics about a pair of eyes to all combinations of pixels selected during correlation, and a scoring technique is used (figures-of-merit) to select the most likely pair of locations for the center of the eyes.

Figure 7:
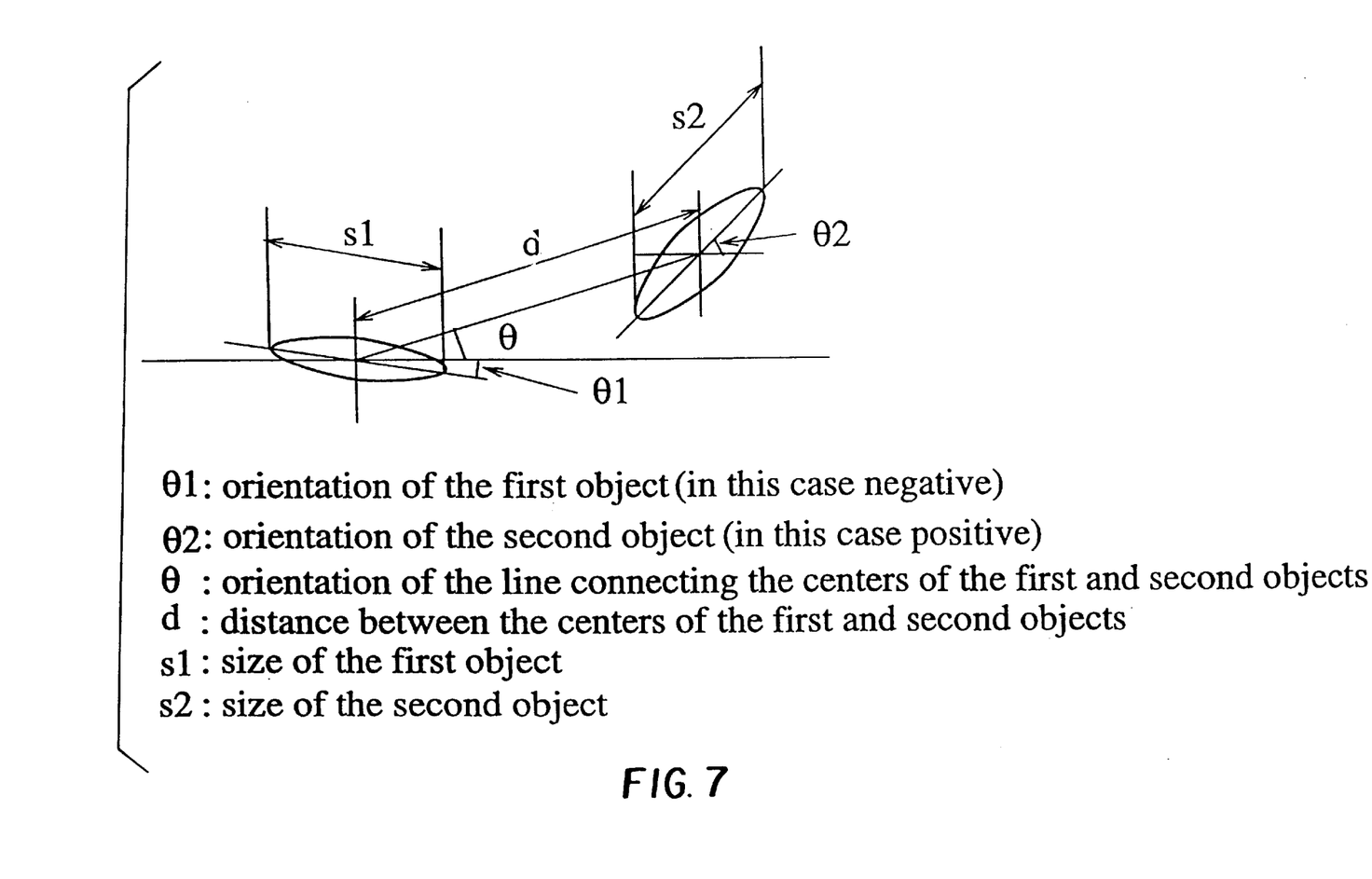
FIG. 7 is an illustration of the verification procedure for the distance between and orientations of the two eyes.

Referring both to FIGS. 2a and 6, the first step is to form all combinations of pixels selected as likely candidates in the concerned flesh region S20. In other words, each peak pixel is paired with all the other peak pixels in the same flesh region. Referring to FIG. 7, the angular orientation is then determined—the angle between the line formed between the two pixels of interest and a horizontal line through one of the points, preferably the leftwardly pixel. If the angular orientation is not within ten degrees of the estimated angular orientation in S14c, the pair is eliminated as possible candidates for the center of both eyes. If it is within five degrees of the estimated angular orientation, the pair is stored along with its particular score.

Also referring to FIG. 7, the distance between the two candidate eyes is determined. If the distance is not proportional to the size of the eyes according to the knowledge of the human faces, the pair is eliminated as possible candidates for the center of both eyes. If the proportion is within 20% of the normal proportion, the pair is stored along with its particular score.

Figure 8:
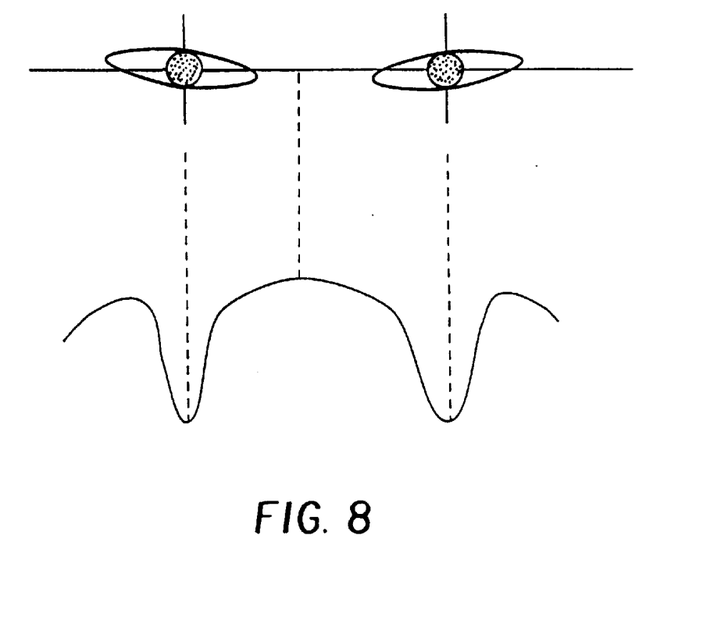
FIG. 8 is an illustration of matching of the eye-to-eye profile.

Referring to FIG. 8, the next step involves taking the pixels along a horizontal line through the two pixels in a possible combination. A graph of code values versus pixel location for each combination will have a shape as illustrated in FIG. 8. If the shape deviates substantially, the pair is eliminated as possible candidates for the center of the eyes; if it does not substantially deviate, the pair is stored along with and its particular score. The deviation is preferably determined by the ratio of the middle peak point and the average of the two valley points, although those skilled in the art can determine other suitable measure of the deviation.

Figure 10:
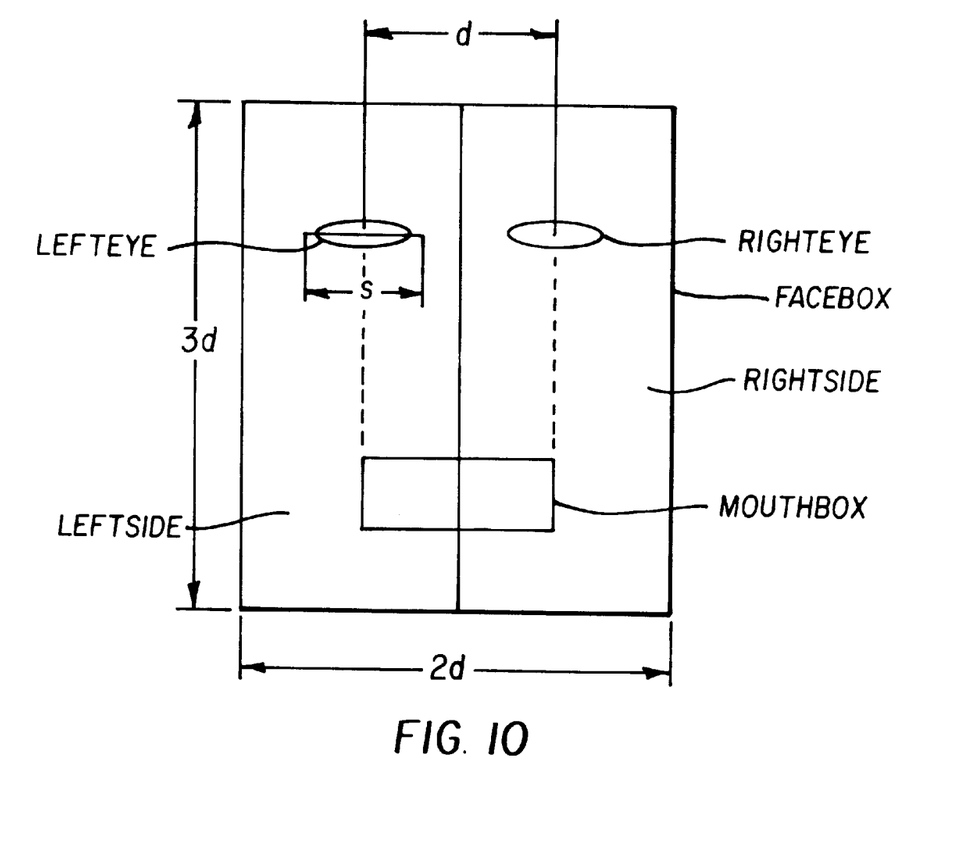
FIG. 10 is an illustration of the face-box and mouth-box.

Referring to FIG. 10, all combinations are then examined for symmetry. This includes taking the distance between all combinations and, at a distance halfway between them, looking for symmetry on both sides of the image through pixels vertically through this halfway point. The region of interest, which contains the face, preferably has a width of twice the distance between the eyes and a height of three times the distance between the eyes. The face region is divided into two halves—the left side and the right ride according to the positions of the eyes. The symmetry is preferably determined by the correlation between the left side and the mirror image of the right side, although those skilled in the art can determine other suitable measure of the symmetry. If symmetry exists for the two sides, the pair and its particular score is again stored; if no symmetry exits, the pair is eliminated as a possible pair of candidates.

All combinations are also examined for their centrality within the extracted sub-image or the fitted ellipse. A preferred measure of such centrality is defined as the distance between the middle points of the two objects and the major axis of the fitted ellipse, although those skilled in the art can determine other suitable measure of the deviation.

Also referring to FIG. 10, the image is next examined for the existence of a mouth at an estimated position. The program searches for three or four parallel lines (edges) within a rectangular box that has a width equal to the distance between the eyes and at a predetermined distance from the pair of pixels being analyzed. This distance is 1.2 times the distance between the candidate pairs, although those skilled in the art may determined other distance values or similar criteria. If the lines (edges) exist, the pair and its particular score are stored; if not, the pair is eliminated as possible candidates.

The combinations are then examined for combined correlation of the two candidates. The combined correlation is the sum of the complete correlation scores at the two candidate locations. If the combined correlation is above a predetermined threshold, the pair and their score are stored; if not, the pair is eliminated as possible candidates.

The most likely pair is the pair that has the highest cumulative scores S22. The final locations of the eyes are determined by this pair S24. The processes of S8–S24 are repeated for the next identified flesh region until the last flesh region is processed.

Figure 9:
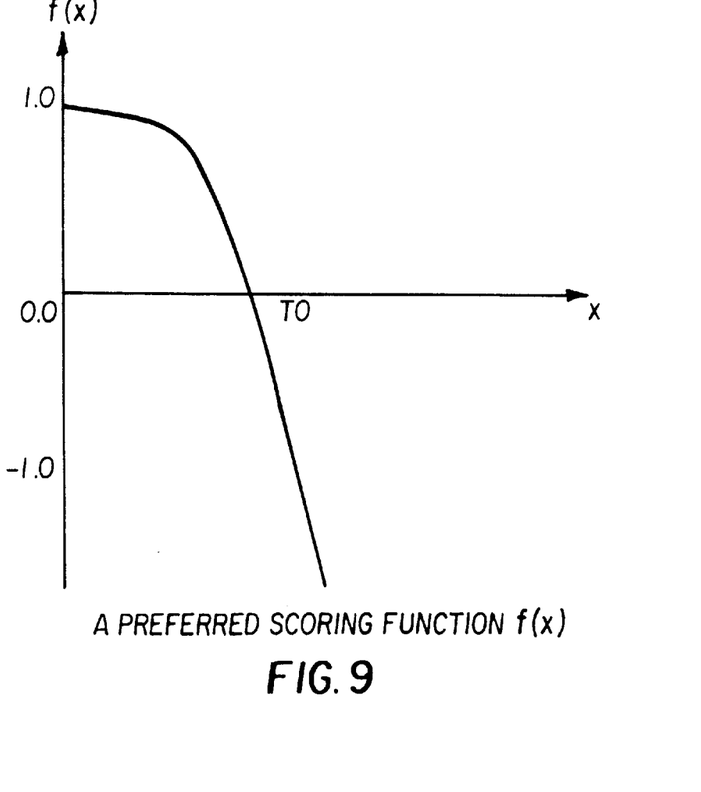
FIG. 9 is an illustration of the scoring function.

The shape of scoring functions for each above-described figure of merit is illustrated in FIG. 9. With this scoring function, even if a combination fails the threshold of a particular figure of merit, it is assigned a large penalty but can still be retained for further consideration instead of being eliminated as described above. If a figure of merit x is satisfactory with respect to the threshold T0, the output of the scoring function, which is the input to the score accumulator, is close to a normalized maximum value of 1.0. If x fails the threshold, a increasing amount of penalty is accessed depending on how badly x fails. The advantage of using such a scoring function is improved robustness if a candidate pair barely fails the threshold but turns out to have the highest cumulative score.

A computer program written in (whatever language) for performing the steps of the present invention is contained in Appendix A.

The invention has been described with reference to a preferred embodiment. However, it will be appreciated that variations and modifications can be effected by a person of ordinary skill in the art without departing from the scope of the invention.

PARTS LIST 10 computer system
20 microprocessor-based unit
30 display
40 keyboard
50 mouse
52 selector
55 CD-ROM
56 printer
57 compact disk
61 floppy disk
62 PC card

What is claimed is:

1. A computer program product for locating first and second human eye objects each having substantially the same physical characteristics, and the ratio of the distance between the first and second human eye objects and the size of each human eye object is substantially invariant, the computer program product comprising: a computer readable storage medium having a computer program stored thereon for performing the steps of:

(a) determining a potential flesh region in an intensity image;

(b) determining valley regions in the intensity image for determining substantially non-flat regions with lower intensity values in a local area of the intensity image;

(c) performing matching in the intensity image using an intensity-based template in a neighborhood of the valley regions within the flesh regions for determining a plurality of locations that give a desirable match of the human eye object relative to the template, said step of matching using cross-correlation to identify desirable locations; and (d) performing verification by mating a pair of potential human eye object candidates with desirable matching response to the template by using a plurality of verification criteria selected from the group including the orientation, proportion, profile, symmetry, and centrality of the paired human eye objects matched to the intensity-based template, wherein the verification criteria comprise finding the best pair of locations of human eye objects by computing figures of merit individually or in combination for the plurality of verification criteria, and wherein the figure of merit for orientation includes measuring the difference between an orientation of a line connecting the first and second human eye objects, and an average orientation of the first and second human eye objects.

2. The computer program product as in claim 1 further comprising either or both (e) determining an estimate size of both the first and second human eye objects based on a shape and size of a determined flesh region or (f) determining an estimate orientation of both the first and second human eye objects based on the shape and orientation of the determined flesh region.

3. The computer program product as in claim 1 further comprising forming a mask image for searching for the first and second human eye objects; the locations where a search is to be performed are determined by the valley regions within the determined flesh region.

4. The computer program product as in claim 1, wherein computing the proportion includes computing a distance between the first and second human eye objects for satisfying an anthropological prior model.

5. The computer program product as in claim 1, wherein computing the profile includes pre-determining a model of an eye-to-eye profile and determining an actual profile from the image and computing a goodness-of-fit between the actual profile and the model profile.

6. The computer program product as in claim 1, wherein computing the symmetry includes computing the symmetry between first and second halves of a face window determined by the eye locations.

7. The computer program product as in claim 1, wherein computing the centrality includes computing a distance from a middle point between the first and second human eye objects to a major axis of the determined flesh region.

8. The computer program product as in claim 1 further comprising the step of normalizing the template for maximizing robustness of matching.

9. The computer program product as in claim 1 further comprising the step of creating an image block of a same size and orientation as the template.

10. The computer program product as in claim 1 further comprising the step of normalizing the image block for maximizing robustness of matching.

11. The computer program product as in claim 9 further comprising the step of extracting individual sub-zones in both the template and the image block, and performing cross-correlation for each corresponding sub-zone.

12. The computer product as in claim 11 further comprising the step of computing an overall cross-correlation score for the image block if the cross-correlation score for each sub-zone exceeds a threshold.

13. A computer program product for locating first and second human eye objects each having substantially the same physical characteristics, and the ratio of the distance between the first and second human eye objects and the size of each human eye object is substantially invariant, the computer program product comprising: a computer readable storage medium having a computer program stored thereon for performing the steps of:

(a) determining a potential flesh region in an intensity image;

(b) determining valley regions in the intensity image for determining substantially non-flat regions with lower intensity values in a local area of the intensity image;

(c) performing matching in the intensity image using an intensity-based template in a neighborhood of the valley regions within the flesh regions for determining a plurality of locations that give a desirable match of the human eye object relative to the template, said step of matching using cross-correlation to identify desirable locations; and (d) performing verification by mating a pair of potential human eye object candidates with desirable matching response to the template by using a plurality of verification criteria selected from the group including the orientation, proportion, profile, symmetry, and centrality of the paired human eye objects matched to the intensity-based template, wherein the verification criteria comprise finding the best pair of locations of human eye objects by computing figures of merit individually or in combination for the plurality of verification criteria, and wherein the figure of merit for symmetry includes computing the symmetry between first and second halves of a face window determined by the locations of the human eye objects.

14. The computer program product as in claim 13 further comprising either or both (e) determining an estimate size of both the first and second human eye objects based on a shape and size of a determined flesh region or (f) determining an estimate orientation of both the first and second human eye objects based on the shape and orientation of the determined flesh region.

15. The computer program product as in claim 13 further comprising forming a mask image for searching for the first and second human eye objects; the locations where a search is to be performed are determined by the valley regions within the determined flesh region.

16. The computer program product as in claim 13, wherein computing the orientation includes measuring the difference between an orientation of a line connecting the first and second human eye objects, and an average orientation of the first and second human eye objects.

17. The computer program product as in claim 13, wherein computing the proportion includes computing a distance between the first and second human eye objects for satisfying an anthropological prior model.

18. The computer program product as in claim 13, wherein computing the profile includes pre-determining a model of an eye-to-eye profile and determining an actual profile from the image and computing a goodness-of-fit between the actual profile and the model profile.

19. The computer program product as in claim 13, wherein computing the centrality includes computing a distance from a middle point between the first and second human eye objects to a major axis of the determined flesh region.

20. The computer program product as in claim 13 further comprising the step of normalizing the template for maximizing robustness of matching.

21. The computer program product as in claim 13 further comprising the step of creating an image block of a same size and orientation as the template.

22. The computer program product as in claim 13 further comprising the step of normalizing the image block for maximizing robustness of matching.

23. The computer program product as in claim 21 further comprising the step of extracting individual sub-zones in both the template and the image block, and performing cross-correlation for each corresponding sub-zone.

24. The computer program product as in claim 23 further comprising the step of computing an overall cross-correlation score for the image block if the cross-correlation score for each sub-zone exceeds a threshold.

25. A computer program product for locating first and second human eye objects each having substantially the same physical characteristics, and the ratio of the distance between the first and second human eye objects and the size of each human eye object is substantially invariant, the computer program product comprising: a computer readable storage medium having a computer program stored thereon for performing the steps of:
   (a) determining a potential flesh region in an intensity image;
   (b) determining valley regions in the intensity image for determining substantially non-flat regions with lower intensity values in a local area of the intensity image;
   (c) performing matching in the intensity image using an intensity-based template in a neighborhood of the valley regions within the flesh regions for determining a plurality of locations that give a desirable match of the human eye object relative to the template, said step of matching using cross-correlation to identify desirable locations; and
   (d) performing verification by mating a pair of potential human eye object candidates with desirable matching response to the template by using a plurality of verification criteria selected from the group including the orientation, proportion, profile, symmetry, and centrality of the paired human eye objects matched to the intensity-based template, wherein the verification criteria comprise finding the best pair of locations of human eye objects by computing figures of merit individually or in combination for the plurality of verification criteria, and wherein the figure of merit for centrality includes computing a distance from a middle point between the first and second human eye objects to a major axis of the determined flesh region.

26. The computer program product as in claim 25 further comprising either or both (e) determining an estimate size of both the first and second human eye objects based on a shape and size of a determined flesh region or (f) determining an estimate orientation of both the first and second human eye objects based on the shape and orientation of the determined flesh region.

27. The computer program product as in claim 25 further comprising forming a mask image for searching for the first and second human eye objects; the locations where a search is to be performed are determined by the valley regions within the determined flesh region.

28. The computer program product as in claim 25, wherein computing the orientation includes measuring the difference between an orientation of a line connecting the first and second human eye objects, and an average orientation of the first and second human eye objects.

29. The computer program product as in claim 25, wherein computing the proportion includes computing a distance between the first and second human eye objects for satisfying an anthropological prior model.

30. The computer program product as in claim 25, wherein computing the profile includes pre-determining a model of an eye-to-eye profile and determining an actual profile from the image and computing a goodness-of-fit between the actual profile and the model profile.

31. The computer program product as in claim 25, wherein computing the symmetry includes computing the symmetry between first and second halves of a face window determined by the eye locations.

32. The computer program product as in claim 25 further comprising the step of normalizing the template for maximizing robustness of matching.

33. The computer program product as in claim 25 further comprising the step of creating an image block of a same size and orientation as the template.

34. The computer program product as in claim 25 further comprising the step of normalizing the image block for maximizing robustness of matching.

35. The computer program product as in claim 33 further comprising the step of extracting individual sub-zones in both the template and the image block, and performing cross-correlation for each corresponding sub-zone.

36. The computer program product as in claim 35 further comprising the step of computing an overall cross-correlation score for the image block if the cross-correlation score for each sub-zone exceeds a threshold.

37. A method for locating first and second human eye objects each having substantially the same physical characteristics, and the ratio of the distance between the first and second human eye objects and the size of each human eye object is substantially invariant, said method comprising the steps of:
   (a) determining a potential flesh region in an intensity image;
   (b) determining valley regions in the intensity image for determining substantially non-flat regions with lower intensity values in a local area of the intensity image;
   (c) performing matching in the intensity image using an intensity-based template in a neighborhood of the valley regions within the flesh regions for determining a plurality of locations that give a desirable match of the human eye object relative to the template, said step of matching using cross-correlation to identify desirable locations; and
   (d) performing verification by mating a pair of potential human eye object candidates with desirable matching response to the template by using a plurality of verification criteria selected from the group including the orientation, proportion, profile, symmetry, and centrality of the paired human eye objects matched to the intensity-based template, wherein the verification criteria comprise finding the best pair of locations of human eye objects by computing figures of merit individually or in combination for the plurality of verification criteria, and wherein the figure of merit for orientation includes measuring the difference between an orientation of a line connecting the first and second human eye objects, and an average orientation of the first and second human eye objects.

38. The method as in claim 37 further comprising either or both (e) determining an estimate size of both the first and second human eye objects based on a shape and size of a determined flesh region or (f) determining an estimate orientation of both the first and second human eye objects based on the shape and orientation of the determined flesh region.

39. The method as in claim 37 further comprising forming a mask image for searching for the first and second human eye objects; the locations where a search is to be performed are determined by the valley regions within the determined flesh region.

40. The method as in claim 37, wherein computing the proportion includes computing a distance between the first and second human eye objects for satisfying an anthropological prior model.

41. The method as in claim 37, wherein computing the profile includes pre-determining a model of an eye-to-eye profile and determining an actual profile from the image and computing a goodness-of-fit between the actual profile and the model profile.

42. The method as in claim 37, wherein computing the symmetry includes computing the symmetry between first and second halves of a face window determined by the eye locations.

43. The method as in claim 37, wherein computing the centrality includes computing a distance from a middle point between the first and second human eye objects to a major axis of the determined flesh region.

44. A method for locating first and second human eye objects each having substantially the same physical characteristics, and the ratio of the distance between the first and second human eye objects and the size of each human eye object is substantially invariant, said method comprising the steps of:

(a) determining a potential flesh region in an intensity image;

(b) determining valley regions in the intensity image for determining substantially non-flat regions with lower intensity values in a local area of the intensity image;

(c) performing matching in the intensity image using an intensity-based template in a neighborhood of the valley regions within the flesh regions for determining a plurality of locations that give a desirable match of the human eye object relative to the template, said step of matching using cross-correlation to identify desirable locations; and (d) performing verification by mating a pair of potential human eye object candidates with desirable matching response to the template by using a plurality of verification criteria selected from the group including the orientation, proportion, profile, symmetry, and centrality of the paired human eye objects matched to the intensity-based template, wherein the verification criteria comprise finding the best pair of locations of human eye objects by computing figures of merit individually or in combination for the plurality of verification criteria, and wherein the figure of merit symmetry includes computing the symmetry between first and second halves of a face window determined by the locations of the human eye objects.

45. The method as in claim 44 further comprising either or both (e) determining an estimate size of both the first and second human eye objects based on shape and size of a determined flesh region or (f) determining an estimate orientation of both the first and second human eye objects based on the shape and orientation of the determined flesh region.

46. The method in claim 44 further comprising forming a mask image for searching for the first and second human eye objects; the locations where a search is to be performed are determined by the valley regions within the determined flesh region.

47. A method for locating first and second human eye objects each having substantially the same physical characteristics, and the ration of the distance between the first and second human eye objects and the size of each human eye object is substantially invariant, said method comprising the steps of:

(a) determining a potential flesh regions in an intensity image;

(b) determining valley regions in the intensity image for determining substantially non-flat regions with lower intensity values in a local area of the intensity image;

(c) performing matching in the intensity image using an intensity-based template in a neighborhood of the valley regions within the flesh regions for determining a plurality of locations that give a desirable match of the human eye object relative to the template, said step of matching using cross-correlation to identify desirable locations; and (d) performing verification by mating a pair of potential human eye object candidates with desirable matching response to the template by using a plurality of verification criteria selected from the group including the orientation, proportion, profile, symmetry, and centrality of the paired human eye objects matched to the intensity-based template, wherein the verification criteria comprise finding the best pair of locations of human eye objects by computing figures of merit individually or in combination for the plurality of verification criteria, and wherein the figure of merit centrality includes computing a distance from a middle point between the first and second human objects to a major axis of the determined flesh region.

48. The method as in claim 47 further comprising either or both (e) determining an estimate size of both the first and second human eye objects based on shape and size of a determined flesh region or (f) determining an estimate orientation of both the first and second human eye objects based on the shape and orientation of the determined flesh region.

49. The method as in claim 47 further comprising forming a mask image for searching for the first and second human eye objects; the locations where a search is to be performed are determined by the valley regions within the determined flesh region.

* * * * *